Jan. 16, 1968 JAMES E. WEBB 3,364,311
ADMINISTRATOR OF THE NATIONAL AERONAUTICS AND SPACE ADMINISTRATION
ELIMINATION OF FREQUENCY SHIFT IN A MULTIPLEX COMMUNICATION SYSTEM
Filed Feb. 7, 1964 2 Sheets-Sheet 1
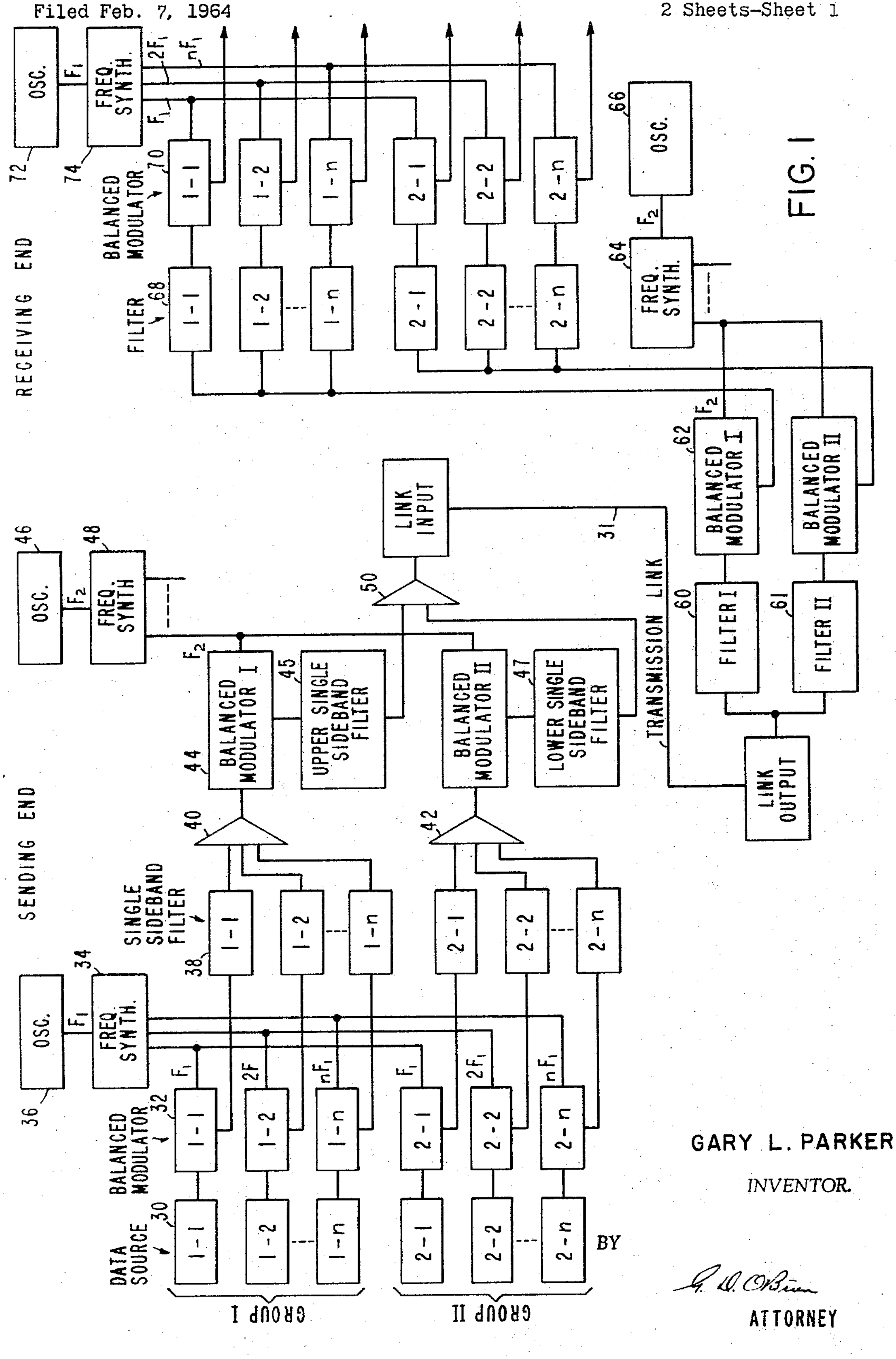
FIG. I
GARY L. PARKER
*INVENTOR.*
BY
ATTORNEY Jan. 16, 1968 JAMES E. WEBB 3,364,311
ADMINISTRATOR OF THE NATIONAL AERONAUTICS
AND SPACE ADMINISTRATION
ELIMINATION OF FREQUENCY SHIFT IN A MULTIPLEX
COMMUNICATION SYSTEM Filed Feb. 7, 1964 2 Sheets-Sheet 2

GARY L. PARKER
*INVENTOR.*

BY

ATTORNEY

United States Patent Office 3,364,311

Patented Jan. 16, 1968

3,364,311

ELIMINATION OF FREQUENCY SHIFT IN A MULTIPLEX COMMUNICATION SYSTEM

James E. Webb, Administrator of the National Aeronautics and Space Administration with respect to an invention of Gary L. Parker, La Crescenta, Calif.

Filed Feb. 7, 1964, Ser. No. 343,426
5 Claims. (Cl. 179—15)

ABSTRACT OF THE DISCLOSURE

A multiplexed communication system suitable for carrying data requiring end-to-end frequency coherence and including means for automatically correcting transmission errors introduced by frequency spectrum shifts. The system includes means for generating a pair of test signals whose frequencies are discretely related and transmitting these signals over the same channel along with the data to be transmitted. By shifting the frequency of both the data and test signals at the receiving end to cause the frequencies of the pair of test signals to assume the same discrete relationship at the receiving end as was assumed at the sending end, the data will be correctly repositioned in the frequency spectrum.

*Origin of the invention*

Figures 2A, 2B, 3A, 3B:
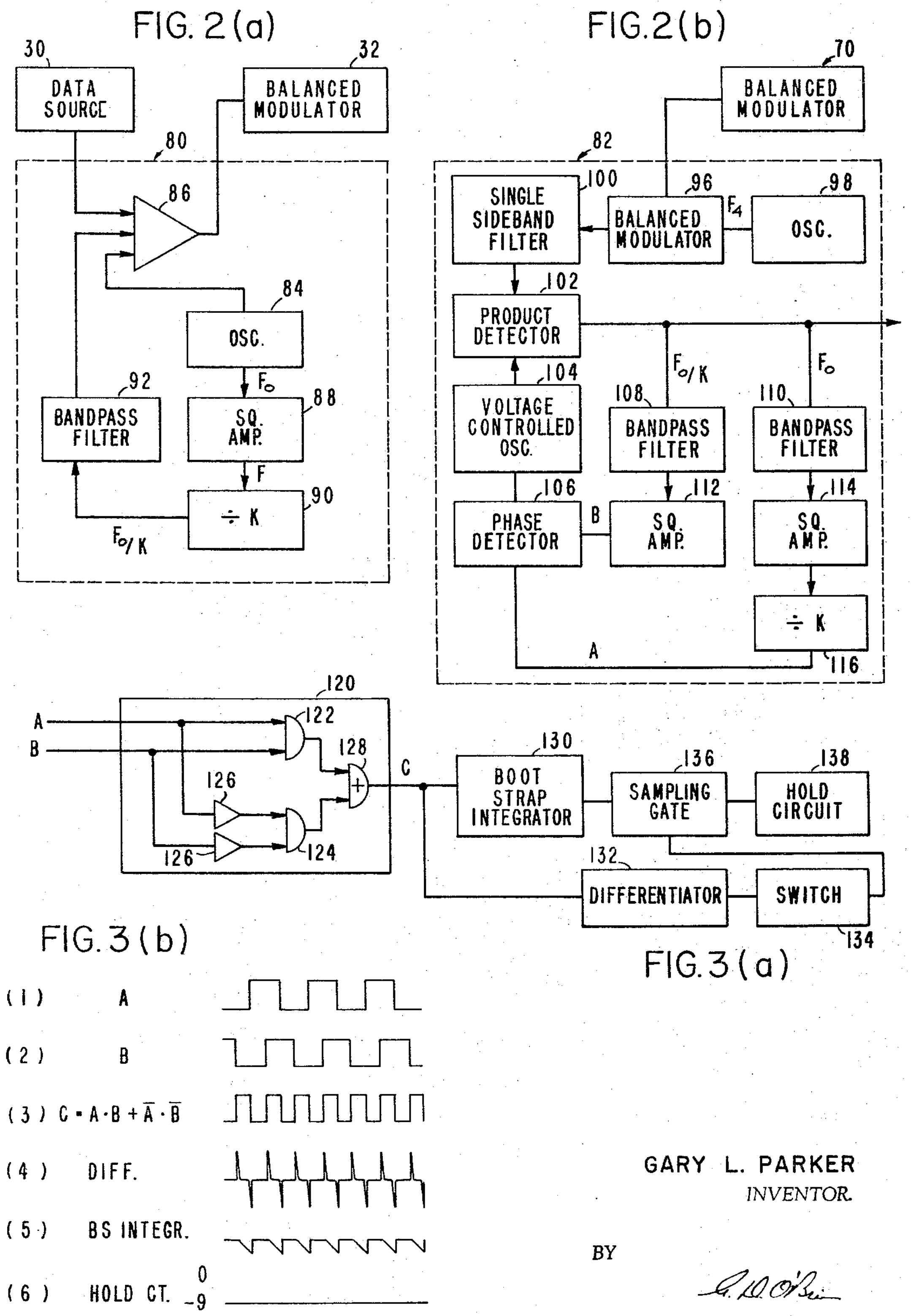

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates generally to communication systems and more particularly to a method and apparatus for compensating for frequency translation effects which are, for example, often encountered in the use of telephone company transmission systems employing multiplex equipment.

Common carrier communication systems today make extensive use of multiplex equipment in order to provide the maximum number of communication channels per physical line employed. Although the use of state of the art multiplex techniques provides very adequate performance in a great many applications, e.g. standard voice communication, performance is not acceptable where the transmission link is used to carry data requiring end-to-end frequency coherence. Unacceptable performance results from the baseband shift or frequency translation often introduced by the multiplex equipment. For example, such translation occurs in a single sideband, frequency division multiplex system when the frequency of the injection signal used in demodulation is not precisely the same as the frequency of the carrier suppressed at the transmitting end of the line.

End-to-end frequency coherence is often required in systems for transmitting telemetry data from a remote location, as e.g. a missile tracking station, to a central data processing facility. As an example of such a system, consider a telemetry baseband consisting of a number of commutated and continuous subcarrier channels where the commutator timing information for the time shared channels is inherent in the non-deviated frequency of the continuous or reference subchannel. If the entire spectrum is translated in transmission, as might be expected using conventional multiplex equipment, the reference frequency is shifted. The sampling rate information on each commutated channel on the other hand is embodied in the carrier-to-sideband relationship and inasmuch as both of these quantities are shifted by the same amount, this information is not effected by the frequency spectrum shift. Thus, with the reference frequency shifted and the sampling rate remaining unchanged, the ability to effectively decommutate is lost.

Certain solutions have been suggested for circumventing this frequency shift problem but for one reason or another none of the solutions has been satisfactory. For example, it has been proposed to employ a broad band data channel utilizing an amplitude modulated carrier in its center with the information thus being carried in the sum-difference relationship between the carrier and its sidebands. Although such a system would provide satisfactory data transmission despite frequency translation, it requires an extravagant and costly use of bandwidth.

In view of the above, it is an object of the present invention to provide equipment suitable for use with existing communication systems for correcting transmission error normally introduced as a result of frequency spectrum shifts.

More broadly, it is an object of the present invention to provide a multiplexed communication system which automatically corrects transmission errors introduced by frequency spectrum shifts.

It is an additional object of the present invention to provide a low cost multiplexed communication system which is suitable for carrying data requiring end-to-end frequency coherence.

It is a further object of the present invention to provide means in a data transmission system for both deriving information indicative of the amount of frequency shift occurring in transmission and for utilizing such information to correctly reposition the data in the frequency spectrum.

Briefly, the invention herein is based on the realization that information representing the amount of frequency shift encountered in a data transmission channel, can be ascertained if a pair of test signals whose frequencies are discretely related, are transmitted on the same channel along with the data. By shifting the frequency of both the data and test signals at the receiving end to cause the frequencies of the pair of test signals to assume the same discrete relationship at the receiving end as was assumed at the sending end, the data is correctly repositioned in the frequency spectrum.

More particularly, consider continuous first and second test signals having frequencies respectively represented by $F_0$ and $F_0/16$. Assume that $F_0$ and $F_0/16$ are chosen to respectively be above and below the upper and lower limits of the frequency band containing the data. In transmission, all transmitted signals will be translated by the same amount, $\Delta$. Thus, the frequencies of the first and second test signals at the receiving end are respectively equal to $F_0+\Delta$ and $$\frac{F_0}{16}+\Delta$$

and therefore do not bear the same discrete relationship at the receiving end as they bore at the sending end, i.e.

16:1. By translating the signals in an opposite direction at the receiving end until the frequencies of the first and second test signals assume a 16:1 relationship, the data will be correctly repositioned in the spectrum.

In a preferred embodiment of the invention, the frequencies of the first and second test signals are discretely related by dividing the output of an oscillator having a frequency $F_0$ in a binary divider to obtain the signal $F_0/16$. At the receiving end, the data and test signals are applied to a balanced modulator and sideband filter to translate them up to scale to some precise intermediate frequency, e.g. 455 kilocycles. The output of the balanced modulator, after filtering to remove the lower sideband, is applied to a product detector which translates the data and test signals down scale by an amount equal to 455 kilocycles plus Δ. The frequency of the signal injected into the product detector is provided by a voltage controlled oscillator and is determined by the output of a phase detector which compares the instantaneous phase of the signal $$\frac{F_0+\Delta}{16}$$

with the signal $$\frac{F_0}{16}+\Delta$$

it being recalled that the rate of change of phase between two signals is a measure of their frequency difference. If the frequency $$\frac{F_0+\Delta}{16}$$

is greater than $$\frac{F_0}{16}+\Delta$$

then the frequency of the signal provided by the voltage controlled oscillator is changed in a first direction and conversely if the frequency $$\frac{F_0}{16}+\Delta$$

is greater than $$\frac{F_0+\Delta}{16}$$

the voltage controlled oscillator output signal frequency is changed in a second direction.

Certain significant features of the preferred embodiment of the invention involve the use of the binary dividers and the arrangement of the phase detector. Using binary dividers is significant because it eliminates any system dependency on the stability of an oscillator. That is, regardless of the stability of the oscillator providing the first test signal, the discrete relationship between the first and second test signals is established by the divider. The phase detector is arranged so as to instantaneously provide a direct current voltage level corresponding to phase angle between the signals applied thereto. A phase lock loop is utilized which locks when the two signals applied to the phase detector are exactly 90° out of phase and thereby of course are of the same frequency. When the two signals are exactly 90° out of phase, the phase detector provides an intermediate DC voltage level to the voltage controlled oscillator. When the frequency of the second of the signals applied to the phase detector is greater than the frequency of the first applied signal, then an increased DC voltage level is provided and conversely when the frequency of the first applied signal is greater than the second applied signal, a reduced direct current level is provided. The phase detector employs a logical compare circuit and a bootstrap integrator. As soon as both signals applied to the phase detector define the same logical level, the bootstrap integrator is triggered to generate a ramp voltage which is terminated when the signals no longer define the same logical level. A sampling gate couples the terminating value of the ramp voltage to a hold circuit which controls the voltage controlled oscillator.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram illustrating a substantially conventional common carrier communication system employing multiplex equipment;

FIGURES 2(*a*) and (*b*) are block diagrams respectively illustrating sending end and receiving end apparatus in accordance with the invention which can be advantageously employed with each of the data channels in an exemplary conventional communication system as shown in FIGURE 1;

FIGURE 3(*a*) is a block diagram of a phase detector which can be suitably employed in the receiving end apparatus of FIGURE 2; and FIGURE 3(*b*) is a chart illustrating diagrams of various waveforms appearing at different points in the phase detector apparatus of FIGURE 3(*a*).

Attention is now called to FIGURE 1 which illustrates a substantially conventional common carrier multiplexed communication system. In such a system, it is generally desired to be able to simultaneously transmit data derived from a plurality of data sources 30 over a transmission link 31. In most practical applications, the data provided by each of the sources 30 is contained within substantially the same bandwidth. In order to be able to simultaneously transmit the data from the various sources, it is common practice to employ a frequency multiplexing technique which effectively moves the bandwidth derived from each data source to a unique position in the frequency spectrum so that the data from the various sources can be simultaneously transmitted and yet still be distinguished at the receiving end of the transmission link.

The data sources 30 are usually separated into a plurality of groups, each group consisting of *n* sources. In the typical system shown in FIGURE 1, two groups of data sources are illustrated. As will be seen hereinafter, each of the data sources is connected to a different data channel, each different channel occupying a different position in the frequency spectrum. Thus, the data sources 1–1, 1–2, and **1–*n* in group I each have their output terminals connected to the input of a different balanced modulator circuit 32; i.e. data source 1–1 is connected to balanced modulator 1–1, data source 1–2 is connected to balanced modulator 1–2, and data source 1–*n* is connected to balanced modulator 1–*n***. Similarly, each of the data sources in group II is connected to the input of a different group II balanced modulator circuit.

A balanced modulator circuit is well known in the art and performs the function of responding to data and carrier signals applied thereto for amplitude modulating the carrier signal with the data signal and providing a carrier suppressed output signal consisting of only a pair of sidebands, each sideband containing the data. In FIGURE 1, the carrier signals applied to each of the balanced modulator circuits 32 are derived from a frequency synthesizer network 34 to which is applied a signal having a frequency $F_1$ by oscillator 36. Frequency synthesizer network 34 develops a plurality of different signals, each having a different frequency. Thus, a signal having a frequency $F_1$ is applied as the carrier signal to balanced modulator circuits 1–1 and 2–1, a signal having a frequency $2F_1$ is applied to balanced modulator circuits 1–2 and 2–2 and a signal having a frequency $nF_1$ is applied to balanced modulator circuits **1–*n* and 2–*n***.

The output of each of the balanced modulator circuits 32 is connected to the input of a different single sideband filter 38. Thus, e.g. the output of balanced modulator 1–1 is connected to the input of single sideband filter 1–1.

Each of the single sideband filters functions to pass only one of the pair of sidebands provided by the associated balanced modulator circuit. The outputs of the filters 38 associated with the group I data sources are applied to the inputs of a summing amplifier 40 while the outputs of the filters associated with the data sources of group II are applied to the inputs of summing amplifier 42. The outputs of summing amplifiers 40 and 42 are respectively connected to the data signal input terminals of balanced modulator circuits 44.

The output of an oscillator 46 providing a signal having a frequency $F_2$ is applied to the input of a frequency synthesizer network 48 which in turn provides a signal having a frequency $F_2$ to the carrier signal input terminals of the group I and II balanced modulator circuits 44. The outputs of the group I and II balanced modulator circuits 44 are respectively applied to the inputs of upper and lower sideband filters 45, 47, both of whose outputs are connected to the input of summing amplifier 50.

It should be apparent that the apparatus in FIGURE 1 discussed thus far functions to position the data provided by each of the data sources 30 at a different unique position in the frequency spectrum. The output of the summing amplifier 50 thus contains all of the data provided by the sources 30 spread out over a portion of the frequency spectrum at least somewhat greater than the product of the number of data sources 30 provided and the bandwidth of each of the data sources. The output of the summing amplifier 50 is connected to the input of a wideband data transmission channel 31 such as a wire line, radio link or microwave link. The output of the wideband channel 31 is connected to the input of a pair of filters 60 and 61 which are respectively tuned to pass the sideband signals having frequencies above and below $F_2$. The outputs of the filters 60 and 61 are respectively connected to the data signal input terminals of group I and group II balanced modulator circuits 6. A frequency synthesizer network 64, connected to the output of oscillator 66 applying a signal having a frequency $F_2$, provides a signal having a frequency $F_2$ to both the group I and group II balanced modulator circuits 62. The output of the group I balanced modulator circuit 62 is connected to the input of each of group I filters 68, each respectively tuned to pass signals having frequencies substantially equal to $F_1$, $2F_1$, and $nF_1$. The output of group II balanced modulator 62 is similarly connected to the input of group II filter 68. Each of the filters 68 is in turn connected to the data signal input terminal of a balanced modulator circuit 70.

Oscillator 72, providing a signal having a frequency $F_1$, is connected to the input of a frequency synthesizer network 74 which in turn provides signals having frequencies $F_1$, $2F_1$, $nF_1$. The signal $F_1$ is applied to the carrier signal input terminal of the channels 1–1 and 2–1 balanced modulator 70. Similarly, the signal $2F_1$ is applied to channel 1–2 and channel 2–2 balanced modulator circuit 70 and the signal $nF_1$ is applied to the channel **1–*n* and channel 2–*n* balanced modulator circuit 70. The output derived from each of the balanced modulator circuits 70, under optimum conditions, should exactly correspond to the output provided by a different one of the data sources 30. In practice however, because the frequencies of the signals injected into the balanced modulator circuits at the receiving end of the transmission link 31 are often not exactly equal to the frequencies of the signal provided to the balanced modulator circuits at the sending end of the transmission link, the data provided by the balanced modulator circuits 70 is not identical to that provided by the data sources 30. That is, the frequency of the signals provided by the balanced modulator circuit 70** is often translated by a small amount. For example, if it is assumed that the data bandwidth extends from 275 cycles to 3500 cycles, it is not unusual to find that the output of the balanced modulator circuits is shifted in frequency either up scale or down scale by as much as five or ten cycles. Where the communication system of FIGURE 1 is utilized to transmit standard voice communications, such a frequency translation introduces insignificant distortion. However, where the system of FIGURE 1 is utilized to transmit data which requires end-to-end frequency coherence, such frequency translation cannot be tolerated.

In accordance with the invention, in order to compensate any data channel for frequency translation effects encountered in the utilization of a system of the type illustrated in FIGURE 1, apparatus 80 as shown in FIGURE 2(*a*), can be connected between the data source 30 and the corresponding balanced modulator circuit 32 of that channel at the system sending end. At the system receiving end, apparatus 82 is coupled to the output of the corresponding balanced modulator circuit 70. Briefly, the apparatus 80 incorporated at the system sending end is utilized to generate a pair of test signals having frequencies which are discretely related. Thus, an oscillator 84 is provided which supplies a signal having a frequency $F_0$ which is both applied to the input of a summing amplifier 86 and to the input of a squaring amplifier 88. The squaring amplifier 88 operates on the sinusoidal oscillating signal provided by oscillator 84 to provide a square wave signal having the same frequency $F_0$. The square wave output signal supplied by the amplifier 88 is applied to the input of a binary divider network 90 which in turn provides a square wave output signal having frequency $F_0/K$ where $K=2m$ and $m$ is any integer. The valves of the parameters $F_0$ and K should preferably be chosen such that the signals having frequencies $F_0$ and $F_0/K$ are respectively immediately above and below the limits of the data bandwith to be transmitted. Thus, if the exemplary data bandwidth extends from 275 cycles of 3500 cycles, then the frequency $F_0$ can be chosen equal to 4000 cycles and K can be chosen equal to sixteen so that the signal having a frequency $F_0/K$ will be equal to 225 cycles. The output of the divider network 90 is applied to the input of a band pass filter 92 which is tuned to the frequency $F_0/K$ and prevents the application of any harmonics thereof to the input of the summing amplifier 86. The output of the data source 30 is connected to the input of the summing amplifier 86 along with the output of the oscillator 84 and the output of the band pass filter 92. The output of the amplifier 86 is connected to the input of the balanced modulator 32, at the sending end of the multiplex equipment.

The output of the balanced modulator 70 at the receiving end of the multiplex equipment is connected to the input of apparatus 82 and more particularly is connected to the data signal input terminal of a balanced modulator circuit 96. An accurate oscillator 98, preferably of the crystal controlled type, is connected to the carrier signal input terminal of the balanced modulator circuit 96. The oscillator 98 supplies an intermediate frequency signal having a frequency $F_4$. The output of the balanced modulator circuit 96 is connected to the input of a signal sideband filter 100 which functions to pass one of the pair of sidebands supplied by the balanced modulator circuit 96. The output of the filter 100 is connected to the input of a product detector 102. The detector 102 performs a function substantially opposite to that performed by the balanced modulator circuit. That is, whereas the balanced modulator circuit caused a data input signal to modulate a carrier signal and then suppressed the carrier signal, which had the effect of merely shifting the data signal up scale in the frequency spectrum, the product detector responds to a data signal, supplied by the filter 100, and a carrier signal, supplied by a voltage controlled oscillator 104, to shift the data signal down scale. Thus, if the frequency of the signal provided by the voltage controlled oscillator 104 is identical to the frequency of the signal provided by the oscillator 98, the data signal derived from the output of the product detector 102 will be identical to the data signal applied to the input of the balanced modulator circuit 96. The center frequency of the voltage controlled oscillator 104 is adjusted to be exactly the same as the frequency of the output signal provided by the oscillator 98. The frequency of the voltage controlled oscillator output signal however can be either increased or decreased, depending upon the voltage level applied thereto by the phase detector 106. The oscillator 104 should preferably be very stable and characterized by a small deviation constant; i.e. relatively large input voltage transitions should be required in order to cause small changes in the output signal frequency.

The output of the product detector 102 is applied to the input of a pair of band pass filters 108 and 110. Filter 108 is tuned to pass signals whose frequencies are substantially equal to $F_0/K$ and filter 110 is turned to pass signals whose frequencies are substantially equal to $F_0$. The outputs of the filters 108 and 110 are respectively applied to the inputs of squaring amplifiers 112 and 114. The output of the squaring amplifier 112 is connected directly to one input of the phase detector 106. The output of squaring amplifier 114 is connected to the input of a binary dividing network 116 which functions to divide the frequency of the signal provided by amplifier 114 by a factor K. The output of the dividing network 116 is connected to the other input of phase detector 106.

If the frequencies of the output signals derived from the amplifier 112 and the dividing network 116 are identical, then the loop including the product detector 102, the filters 108 and 110, the amplifiers 112 and 114, the dividing network 116, the phase detector 106, and the voltage controlled oscillator 104, will lock. On the other hand, if the frequencies of the signals derivde from the amplifier 112 and dividing network 116, are not identical, e.g. if the frequency of the signal provided by network 116 is greater than the frequency of the signal provided by amplifier 112, then the phase detector 106 will provide a voltage signal to the oscillator 104 to cause it to provide an output signal having a frequency above its center frequency. Conversely, the frequency of the oscillator output signal is reduced below the center frequency in the event that the frequency of the amplifier 112 signal is less than the frequency of the signal provided by the network 116. It should be apparent that the same discrete frequency relationship imparted to the test signals respectively provided by the oscillator 84 and network 90 at the system sending end as shown in FIGURE 2(*a*) will exist at the system receiving end when either the transmission frequency translation, $\Delta$, is equal to 0 or when an opposite frequency translation ($-\Delta$) is developed at the receiving end. If the test signals out of the product detector do not bear the discrete relationship imparted to them at the system sending end, then the frequency of the output signal provided by amplifier 112 will be different from the frequency of the output signal provided by network 116. The direction of this difference controls the output voltage level developed by the phase detector 106 which in turn controls the frequency of the output signal provided by the oscillator 104. The frequency of the output signal derived from the oscillator 104 of course determines whether the output signal provided by the balanced modulator circuit 70 is to be shifted up or down scale to compensate for any frequency translation introduced in transmission. When $\Delta=0$, the frequency of the output signal provided by oscillator 104 is exactly equal to the frequency of the output signal provided by oscillator 98 and the frequency of the output signal provided by the product detector 102 is identical to that provided by the balanced modulator circuit 70.

In many applications, the test signals which form part of the output of the product detector 102 will have no effect on the usability of the transmitted data inasmuch as they fall outside of the data bandwidth and in these applications there is no need to remove the test signals prior to using the transmitted data. If, however, the system application requires the removal of these signals, they can of course be removed by merely connecting low and high pass filters in series with the product detector output terminal.

From the foregoing, it should be apparent that the invention thus far described compensates for the introduction of any frequency translation in the transmission of data. Although a system utilizing only two groups of data channels, each group including *n* channels, has been illustrated, it should be understood that many more channels can actually be utilized, the number being limited by frequency bandwidth considerations, amplification and attenuation considerations, etc. It is pointed out that the system illustrated in FIGURE 1 has been introduced only for the purpose of demonstrating a significant area of utility for the invention disclosed herein. It should be understood that the teachings of the invention are equally as well applicable in any system in which frequency translation effects are encountered regardless of the nature of the system. In view of the purpose for which FIGURE 1 is offered, no attempt has been made to illustrate any stages of amplification or such which would normally be required. It is further pointed out that the equipment thus far discussed is useful for correcting for frequency translation effects encountered in any channel of a typical and existing data communication system on which end-to-end frequency coherence is desired. The invention can be easily extended to correct for frequency translation effects on all channels by using the voltage controlled oscillator 104 to directly control the oscillator 72 (FIGURE 1). In this event, the modulator circuit 96 and product detector 102 could be eliminated.

Blocks have been utilized in FIGURES 1 and 2 to represent the various circuits inasmuch as conventional circuits can be utilized in most instances. However, inasmuch as known phase detectors do not operate rapidly enough to be satisfactorily utilized as phase detector 106, FIGURE 3, forming a part hereof, illustrates a phase detector apparatus which is suited to the function required of the phase detector 106.

Attention is initially called to FIGURE 3(*b*) which in line 1 thereof illustrates the waveform of a signal A representing the output of network 116 of FIGURE 2(*b*) and in line 2 thereof illustrates the waveforms of a signal B representing the output of amplifier 112. From what has been said with respect to the operation of the apparatus of FIGURE 2, it should be apparent that the function required of the phase detector 106 is to compare the frequencies of the signals provided by the amplifier 112 and network 116. If very fast frequency comparison is desired, the rate of phase change of the signals, rather than the frequencies directly, can be considered. If the phase relationship between the signals applied to the phase detector 106 remains identical then, the frequencies of the signals are necessarily identical. The phase relationship between the waveforms A and B of FIGURE 3(*b*) is derived by applying the signals to an exclusive "or" logic circuit 120 which develops the function $$C=A\cdot B+\overline{A}\cdot\overline{B}$$

where C represents the logic circuit output signal. The logic circuit 120 includes a pair of And gates 122 and 124. The signals A and B are applied directly to the input of And gate 120 and through inverters 126 to the inputs of gate 124. The output of gates 122 and 124 are connected to the inputs of an Or gate 128. The waveform of the output signal derived from Or gate 128 is illustrated in line 3 of FIGURE 3(*b*).

If the frequencies of the signals A and B in lines 1 and 2 are identical and if the signals are exactly 90° out of phase, then the positive and negative states of the waveform in line 3 of FIGURE 3(*b*) will be of the same duration. If on the other hand the frequency of signal B increased while the frequency of signal A remained constant, then signal B would tend to slide to the left in FIGURE 3(*b*) and the durations of the positive states of the waveform in line 3 of FIGURE 3(*b*) would become longer. On the other hand, if the frequency of signal B decreased, then the duration of the positive states of signal C would become shorter. Thus, the duration of the positive states of signal C are indicative of the phase relationship between signals A and B applied to the logic circuit 120. In order to develop a voltage level proportional to the time duration of the positive states of signal C, the output of the logic circuit 120 is connected to the input of both a bootstrap integrating circuit 130 and a differentiator circuit 132. The differentiator circuit 132 will provide an output signal consisting of very short positive and negative going pulses at the beginning and end, respectively of the positive states of the signal applied thereto. The output of the differentiator circuit 132 is illustrated in line 4 of FIGURE 3(*b*).

The bootstrap integrator 130 functions to provide a linear ramp voltage output signal which is initiated and terminated by the beginning and end, respectively of the positive states of the input applied thereto. The waveform of the output of the bootstrap integrator circuit 130 is illustrated in line 5 of FIGURE 3(*b*). A transistor switch 134 that closes only during negative pulses, is connected to the output of the differentiator circuit 132. The switch 134 controls a sampling gate 136 whose input is derived from the output of the bootstrap integrating circuit 130. The output of the sampling gate 136 is connected to the input of a voltage holding circuit 138 which in its simplest embodiment comprises a capacitor connected in a long time constant circuit. Negative spikes provided by the differentiator circuit 132 control the switch 134 to in turn enable the sampling gate 136 for coupling the terminal ramp voltage signal level developed by the bootstrap integrating circuit 130 to the holding circuit 138. In order to prevent coupling the ramp voltage signal to the holding circuit exactly when the ramp portion is terminating, i.e. when it is dropping to zero, a slight delay is preferably incorporated in the integrator circuit 130.

Thus, so long as the signals A and B maintain the same phase relationship, and thus the same frequency relationship, the ramp terminal voltage level coupled through the sampling gate 136 to the hold circuit 138 will remain constant. Line 6 of FIGURE 3(*b*) illustrates a constant voltage available at the output of the hold circuit 138. A typical voltage which was utilized as the center voltage in a device constructed in accordance with the block diagram of FIGURE 3(*a*) was −9 volts and the dynamic range was from 0 to −18 volts.

Frequency translation in the transmission system of FIGURE 1 causing an increase in the relative frequency of signal B will cause an increase in the time duration of the positive states of signal C. Thus, the ramp voltages generated by the integrating circuit 130 will be terminated later and the voltage on the holding circuit 138 will move from −9 volts toward −18. In response to this change of direct current voltage level provided by the phase detector 106, the frequency of the output signal provided by the oscillator 104 is increased to in turn translate the data down scale to compensate for the relative frequency increase of signal B with respect to signal A. If on the other hand the frequency of signal B decreased with respect to the frequency of signal A, then the duration of the positive states of signal C would be shorter and the voltage level on the holding circuit 138 would move from −9 volts toward 0 volts. This change would reduce the frequency of the output signal provided by oscillator 104 to translate the data up scale to compensate for the frequency translation encountered in transmission.

From the foregoing, it should be apreciated that a method and apparatus has been disclosed herein for compensating for frequency translation effects encountered in any data communciation system. It should of course be realized that the term data is used herein to encompass virtually all types of transmission. Thus, although frequency translation compensation in accordance with the invention finds its most significant utility in situations where end-to-end frequency coherence is required, it should be apparent that to a limited extent, improved transmission would be achieved even for standard voice communication.

It has already been mentioned that the circuit blocks in FIGURES 1 and 2 represent conventional equipment except perhaps for the phase detector whose arrangement is illustrated in block form in FIGURE 3(*a*). It should be apparent that the circuit blocks of FIGURE 3(*a*) are similarly representative of conventional equipment. It is further pointed out that although the modulator and detector circuits disclosed in the preferred embodiment of the invention are specified as being of the balanced modulator type and product detector type, respectively, it should be apparent that other types of modulator and detector circuits could be satisfactorily employed.

What is claimed is:

1. For use with a data channel having sending and receiving ends and having means applying a data signal contained in a first frequency band to said sending end, means for correcting for any frequency shift introduced between said sending and receiving ends, said means comprising an oscillator producing a first continuous signal having a frequency, $F_0$, greater than the upper limit of said first frequency band; sending end frequency divider means; means applying said first continuous signal to said sending end frequency divider means for producing a second continuous signal having a frequency, $F_0/K$, less than the lower limit of said first frequency band; means applying said first and second continuous signals to said data transmission channel sending end; modulating means at said receiving end for translating said first frequency band and said first and second continuous signals in a first direction in the frequency spectrum by a precise amount; demodulating means at said receiving end for translating said first frequency band and said first and second continuous signals in a second direction in the frequency spectrum by a variable amount; first and second filter means coupled to said receiving end for respectively isolating said first and second continuous signals; receiving end frequency divider means for producing an output signal having a frequency equal to the product of $1/K$ and the frequency of a signal applied thereto; means applying said isolated first continuous signal to said receiving end frequency divider means; phase detector means for providing an output signal related to the phase difference between a pair of signals applied thereto; means applying said isolated second continuous signal and said output signal produced by said receiving end frequency divider means to said phase detector means; a receiving end oscillator for providing an output signal having a frequency related to a signal applied thereto; means applying said output signal produced by said phase detector means to said receiving end oscillator; and means coupling said receiving end oscillator to said demodulating means.

2. The apparatus of claim 1 wherein said modulating and demodulating means respectively comprise a balanced modulator circuit and a product detector circuit; and wherein said receiving end oscillator comprises a voltage controlled oscillator which provides an output signal having a frequency which is proportional to a voltage level applied thereto.

3. The apparatus of claim 1 wherein said phase detector means includes a logic circuit having an output terminal; circuit means responsive to a signal level transition in a first direction at said logic circuit output terminal for initiating the generation of a ramp voltage signal and to a signal level transition in a second direction for terminating said generation of said ramp voltage signal; a voltage holding circuit; a sampling gate coupling said circuit means to said voltage holding circuit; and means responsive to signal level transitions in said second direction at said logic circuit output terminal for enabling said sampling gate for coupling the terminated level of said ramp voltage signal to said holding circuit.

4. The apparatus of claim 1 wherein said means applying said first continuous signal to said sending end frequency divider means includes a squaring amplifier; and wherein said means applying said second continuous signal to said data transmission channel sending end includes a band pass filter tuned to a frequency $F_0/K$.

5. The apparatus of claim 4 wherein each of said sending end frequency divider means and said receiving end frequency divider means comprises a binary divider network.

References Cited

UNITED STATES PATENTS

| | | | |
|---|---|---|---|
| 3,202,765 | 8/1965 | Byrne | 179—15 |
| 3,182,259 | 5/1965 | Holder | 325—50 |
| 3,176,226 | 3/1965 | Berger | 179—15 |
| 3,088,070 | 4/1963 | Robel | 325—50 |
| 2,724,742 | 11/1955 | Chesnut | 325—49 |
| 2,530,614 | 11/1950 | Hugenholtz | 325—49 |
| 3,068,416 | 12/1962 | Meyer | 325—61 |

ROBERT L. GRIFFIN, *Primary Examiner.*

JOHN W. CALDWELL, *Examiner.*